United States Patent [19]

Hoxmeier et al.

[11] Patent Number: 5,461,116
[45] Date of Patent: Oct. 24, 1995

[54] CORE FUNCTIONALIZED STAR BLOCK COPOLYMERS

[75] Inventors: Ronald J. Hoxmeier; Bridge A. Spence; Jeffrey G. Southwick, all of Houston, Tex.

[73] Assignee: Shell Oil Company, Houston, Tex.

[21] Appl. No.: 336,965

[22] Filed: Nov. 10, 1994

[51] Int. Cl.$^6$ .................................................. C08F 297/04
[52] U.S. Cl. ........................ 525/314; 525/122; 525/250; 525/332.2; 525/359.3; 525/359.4; 525/385; 525/370; 525/379; 525/386
[58] Field of Search ..................................... 526/250, 314, 526/332.2, 359.4, 359.3, 122, 386, 385, 370, 379

[56] References Cited

U.S. PATENT DOCUMENTS

| | | |
|---|---|---|
| 4,141,847 | 2/1979 | Kiovsky. |
| 4,222,882 | 9/1980 | Brulet et al.. |
| 4,229,308 | 10/1980 | Brulet et al.. |
| 4,244,862 | 1/1981 | Handa et al.. |
| 4,409,357 | 10/1983 | Milkovich. |
| 4,417,029 | 11/1983 | Milkovich. |
| 4,427,834 | 1/1984 | Martin. |
| 4,497,748 | 2/1985 | Vitus et al.. |
| 4,970,265 | 11/1990 | Willis. |
| 5,344,887 | 9/1994 | Sutherland ................................ 525/299 |

*Primary Examiner*—Joseph L. Schofer
*Assistant Examiner*—I. Zemel
*Attorney, Agent, or Firm*—Donald F. Haas

[57] ABSTRACT

A core functionalized star block copolymer formed of a vinyl aromatic hydrocarbon and/or a conjugated diene and a polyalkenyl aromatic coupling agent wherein the core functionalization is provided by reaction of the star polymer core with an asymmetric bi- or polyfunctional capping agent.

2 Claims, No Drawings

CORE FUNCTIONALIZED STAR BLOCK COPOLYMERS

BACKGROUND OF THE INVENTION

The present invention relates to core functionalized star block copolymers and processes for making them. More particularly, the invention relates to novel star block copolymers which have asymmetric bi- or polyfunctional capping agents extending from the cores of the block copolymer.

Star block copolymers of conjugated dienes and/or vinyl aromatic hydrocarbons are well known and have been made commercially for many years. Such block copolymers are usually made by anionic polymerization of the monomers to form living polymer arms which are then coupled with a polyfunctional coupling agent which usually is a polyalkenyl aromatic compound such as divinyl benzene. After the coupling of the arms to the core is completed, the core is still "living" and capable of further reaction. The living core is terminated by the addition of alcohols, water, acids, or other acidic (protic) species.

For many reasons, it would be advantageous to introduce polar or low surface energy functionality into such star polymers. For example, polar functionality could increase the adhesion to polar surfaces of these polymers and lead to their wider use in adhesives or release agents. Such polymers might also be used in asphalt modification.

U.S. Pat. No. 4,417,029 describes star block copolymers having functional groups associated with the nucleus of the copolymers. Most of the derivatizing agents described in this patent are monofunctional compounds. In every case, this monofunctional group is changed by the derivitization reaction itself, often times to something less desirable. The few examples given of bifunctional derivatizing agents are symmetric, i.e., all of the functional groups are identical. In such a case, undesirable crosslinking tends to occur since the reaction is purely a statistical reaction. Crosslinking can be avoided by using a large excess of the derivitizing agent but this creates the disadvantage of having to remove a large amount of unreacted excess derivatizing agent, The present invention provides a method for avoiding these disadvantages. Since the capping agent contains the functionality which is desired to extend from the polymer core and also a functional group of high reactivity for the capping reaction and different from the desired functional group, high selectivity to the reaction which allows the desired functional group to extend from the core is obtained. This is obtained without altering the chemical structure of the desired functional group and without undesirable crosslinking reactions. Furthermore, this invention allows the incorporation of functionality which was previously impossible to incorporate in anionic polymers, i.e. fluorine, $NR_2$, $(OCH_2CH_2)_xOR$, and metallocene, since they are unreactive toward the lithiated core or are destroyed by it through metallation (lithiation).

SUMMARY OF THE INVENTION

The present invention provides novel functionalized star block copolymers which have polar or low surface energy functionality extending from the core of the star block copolymer. In a preferred embodiment, the star block copolymer should contain from 0.05 to 10 percent by weight of this functionality. The polymers are formed of a vinyl aromatic hydrocarbon and/or at least one conjugated diene.

Such star block copolymers are made by reacting the living star block copolymer core with an asymmetric bi- or polyfunctional capping agent which incorporates the desired functionality which is to extend from the core and another type of functional group which will react with the living core and attach the molecule to the core through the latter functional group. Generally, from 0.05 to 10% by weight of the capping agent is necessary.

DETAILED DESCRIPTION OF THE INVENTION

Polymers containing ethylenic unsaturation can be prepared by copolymerizing one or more polyolefins, particularly a diolefin. The copolymers may, of course, be random, tapered, block or a combination of these, as well as linear, star or radial.

The polymers containing ethylenic unsaturation may be prepared using anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet, a liquid, or the like. Polymers containing ethylenic unsaturation are available commercially from several suppliers.

In general, when solution anionic techniques are used, copolymers of conjugated diolefins are prepared by contacting the monomer or monomers to be polymerized simultaneously or sequentially with an anionic polymerization initiator such as group IA metals, their alkyls, napthalides, biphenyls or anthracenyl derivatives. It is preferred to use an organo alkali metal (such as sodium, lithium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$RLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Vinyl aromatic hydrocarbons may also be included in the block copolymers. Styrene, alphamethyl styrene, and other substituted styrenes may be used but styrene is preferred because of its lost cost and availability. The polymers of this invention may generally comprise from about 0 percent up to about 50 percent by weight of the vinyl aromatic hydrocarbon.

The star polymers of the present invention are block copolymers having at least three arms which are comprised of at least one block of a vinyl aromatic hydrocarbon and/or a conjugated diene which are attached to a central core. Such polymers may have up to 30 or 40 arms.

As discussed above, the star polymers are made by coupling polymer arms using a polyfunctional coupling agent or coupling monomer. A preferred coupling agent is a polyalkenyl aromatic coupling agent such as those described in U.S. Pat. Nos. 4,010,226, 4,391,949 and 4,444,953, which are herein incorporated by reference. U.S. Pat. No. 5,104, 921, which is also herein incorporated by reference, contains a complete description of such polyalkenyl aromatic compounds at columns 12 and 13. Divinyl aromatic hydrocarbons containing up to 26 carbon atoms per molecule are preferred and particularly divinyl benzene in either its meta, or para isomer and commercial divinyl benzene which is a mixture of said isomers is also quite satisfactory. The coupling agent is preferably added to the living polymer after the polymerization is substantially complete. The amount of coupling agent varies between wide limits but preferably at least one equivalent is used per equivalent of unsaturated living polymer to be coupled. The coupling reaction is generally carried out in the same solvent as for the polymerization reaction. The temperature varies between wide limits, for example, from 25° C. to 95° C.

In general, any of the solvents known in the prior art to be useful in the preparation of such polymers may be used. Suitable solvents, then, include straight- and branched chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as alkyl-substituted derivatives thereof; aromatic and alkyl-substituted derivatives thereof; aromatic and alkyl-substituted aromatic hydrocarbons such as benzene, napthalene, toluene, xylene and the like; hydrogenated aromatic hydrocarbons such as tetralin, decalin and the like; linear and cyclic ethers such as methyl ether, methylethyl ether, diethyl ether, tetrahydrofuran and the like.

More specifically, the polymers of the present invention are made by the anionic polymerization of the monomers in a hydrocarbon solvent at a temperature between 0° and 100° C., preferably 25° to 80° C., using an alkyl lithium initiator. The living polymer chains are usually coupled by addition of divinyl monomer to form a star polymer. Additional monomers may or may not be added to grow more branches or to terminally functionalize the polymer.

It is important that the coupling go as closely to completion as possible. The coupling reaction should not be terminated. There must be at least one active site on the coupling agent core of the polymer. The asymmetric bi- or polyfunctional capping agent is then introduced to the polymer and reacted therewith. Generally, the conditions are 25° to 90° C. for up to one hour and from 0.05 to 10% by weight of the agent is used. The exact method of reaction differs according to the nature of the capping agent.

Capping agents within the scope of the present invention include perfluoroaldehydes, perfluoroketones, perfluoroalkanoylchlorides, perfluoroesters, perfluoroetheresters, formylesters, polyoxyalkenylene esters, aminoaldehydes, metallocenealdehydes, epoxides of aldehydes, diepoxides of ketones, and epoxide derivatives of silanes. A metallocene is an organometallic coordination compound obtained as a cyclopentadienyl derivative of a transition metal. Two types of metallocenes useful herein are (1) dicyclopentadienyl-metals with the general formula $(C_5H_5)_2M$, and (2) monocyclopentadienyl-metal compounds with the general formula $(C_5H_5MR_{1-3})$ where R is CO, NO, or alkyl.

The perfluoro capping agents add fluorine functionality to the core of the polymer. The formyl ester capping agents add ester functionality. The polyoxyalkenylene capping agents add polyoxyalkenylene, i.e. polyoxyethylene, polyoxypropylene, etc., functionality. The amino aldehydes add amino functionality. The metallocene aldehydes add metallocene functionality. Diepoxides add epoxide functionality. The preferred capping agents are those bearing perfluoro groups, polyether groups, amino groups, and epoxides because they offer many useful applications and were heretofore not available or very difficult to make via anionic polymerization processes.

It is highly preferred that the asymmetric capping agents be chosen so that the reactivity of the functional group which it is desired to have extend from the polymer core is much less than the reactivity of the functional group which is to react with the polymer core to attach the molecule there. Obviously, this is important to increase the selectivity of the desired reaction as opposed to the opposite reaction. Table 1 below contains several examples of bi- or polyfunctional capping agents which, when reacted as described herein, leave the desired functionality completely unchanged and extending from the polymer core.

TABLE 1

| XY Capping Agent | Reactivity X >> Y Capping Group X | Desired Imparted Functionality Y (Unchanged) |
|---|---|---|
| H-C(=O)-⌬-C(=O)-OR | H-C(=O)- | -⌬-C(=O)-OR |
| RO-C(=O)-CH₂-(OCH₂CH₂)₂₅-OR' | RO-C(=O)- | -(OCH₂CH₂)₂₅OR' |
| H-C(=O)-C₆F₄-F (pentafluorobenzoyl) | H-C(=O)- | -C₆F₄-F (pentafluorophenyl) |

TABLE 1-continued

| XY Capping Agent | Reactivity X >> Y Capping Group X | Desired Imparted Functionality Y (Unchanged) |
|---|---|---|
| (acetal-protected ketone with C=O) | $-C(=O)-$ | (acetal-protected group with central C) |
| ferrocenyl aldehyde (o-formyl ferrocene) | $-C(=O)H$ | ferrocenyl group |
| $RO-C(=O)-(CF_2)_6-CF_3$ | $RO-C(=O)-$ | $-(CF_2)_6CF_3$ |
| $H-C(=O)-C_6H_4-NR_2$ | $H-C(=O)-$ | $-C_6H_4-NR_2$ |

After the capping agent reaction has proceeded, the reaction mixture is terminated with a proton source such as methanol, water, acetic acid or the like. The polymer is then separated from the polymer cement by conventional means.

The star polymers capped with polyethers are useful in emulsions and water dispersions. Amines and epoxides are useful for adhesion to polar surfaces. Polymers capped with perfluoro groups are useful in applications requiring low surface energy, e.g., nonstick or release applications.

EXAMPLES

Example 1

The following is a description of the synthesis of a star polymer wherein 70 percent of the arms were styrene-isoprene diblocks (11,000 and 60,000, respectively, peak molecular weight as determined by gel permeation chromatography) and 30 percent of isoprene arms (60,000 peak molecular weight as determined by gel permeation chromatography). These arms were coupled to a core of divinylbenzene which was not terminated so the polymer which was available for reaction with the capping agents could be represented by the following formula:

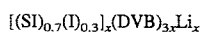

[(SI)$_{0.7}$(I)$_{0.3}$]$_x$(DVB)$_{3x}$Li$_x$

This master batch was synthesized to provide a living coupled star polymer for subsequent core functionalization reactions. The polymer had 15 to 30 arms.

720 pounds cyclohexane and 8.8 pounds of styrene were combined and 0.37 moles of sec-butyl lithium was added and the temperature increased to 50° C. and held there for 30 minutes to polymerize the styrene and produce living polystyryl lithium. Then 0.16 moles of sec-butyl lithium and 71 pounds of isoprene were added to grow SI and I arms in parallel. The polymerization was carried out at 60° C. for 60 minutes. Then 1.59 moles of divinyl benzene (DVB) was added and the coupling reaction was allowed to proceed for one hour at 60° C. This gave a DVB:lithium molar ratio of 3:1.

The coupling reaction was not terminated. The batch was split into aliquots for reaction with various functionalized capping agents.

Example 2

Twelve gallons of the cement containing the living star polymer was transferred to a pressure vessel. The cement contained 52 millimoles of living polymer. To this was added 10.2 grams of pentafluorobenzaldehyde (52 millimoles aldehyde:lithium ratio of 1:1). The vessel was rolled on a mechanical roller for 30 minutes at a temperature of 50° C. and then the reaction was terminated with methanol. The cement was steam coagulated to give about 8 pounds of fluorinated core functionalized star polymer. The elemental analysis determined that the product contained 0.22 percent by weight of fluorine. This implies essentially complete capping of the DVB core with C$_7$F$_5$HO because the calculated amount of fluorine was about 0.15 percent by weight.

Example 3

Three liters (2400 grams; 5.3 pounds) of the living cement of Example 1 was transferred to a one gallon jug fitted with a septum. The cement contained about 3.5 millimoles of living polymer. To this was added 2.1 grams of methyl perfluoro octanoate (5 millimoles). The jug was placed on a laboratory shaker and reacted for 30 minutes at about 50° C. and then terminated with methanol and coagulated with isopropyl alcohol. The product was collected by filtration and vacuum dried overnight at 50° C. About 0.5 pounds of fluorinated core functionalized star polymer was obtained. Elemental analysis showed 0.24 percent by weight fluorine whereas the total possible calculated amount at a rate of 1 mole of the perfluoro compound per mole of lithium would be 0.4 percent by weight. Thus, the reaction proceeded to about 60 percent completion.

Example 4

This experiment was carried out according to the procedure of Example 3 except that the capping agent was perfluoroctanoyl chloride. The elemental analysis showed 0.39 percent by weight fluorine whereas the total possible amount would be 0.4 percent by weight, again indicating essentially complete reaction.

Example 5

This experiment was carried out according to the procedure of Example 3 except that the capping agent was F—[CF(CF$_3$)CF$_2$O]$_4$—CF(CF$_2$)CO$_2$CH$_3$. The elemental analysis showed 0.22 percent by weight fluorine whereas the calculated total possible amount was 0.8 percent by weight, indicating 27 percent conversion.

Example 6

This experiment is carried out according to the procedure of Example 3 except that the capping agent is emethyl-4-formyl benzoate and 6.4 millimoles of the capping agent is used. This reaction incorporates the functional group

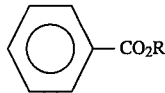

onto the core of the star polymer wherein R is alkyl, phenyl, benzyl, etc., in this case methyl.

Example 7

This experiment is carried out according to the procedure of Example 3 except that the capping agent is R'-(OCH$_2$CH$_2$)$_{25}$-OCH$_2$CO$_2$R and two millimoles of the capping agent is used. This reaction incorporates polyethylene oxide having a molecular weight of about 1100 onto the core of the star polymer.

Example 8

This experiment is carried out according to the procedure of Example 3 except that the capping agent is 4-dimethylaminobenzaldehyde and 6.4 millimoles of the capping agent are used. This reaction incorporates the functional group

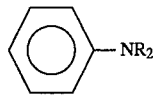

into the core of the star polymer wherein R is alkyl, benzyl, phenyl, etc., in this case methyl.

Example 9

This experiment is carried out according to the procedure of Example 3 except that the capping agent is ferrocene carboxyaldehyde and 6.4 millimoles of the capping agent are used. This reaction incorporates

functionality into the core of the star polymer.

We claim:

1. A core functionalized star block copolymer formed of a vinyl aromatic hydrocarbon and/or at least one conjugated diene and a polyalkenyl aromatic coupling agent wherein the core functionalization is provided by reaction of the star polymer core with an asymmetric bi- or polyfunctional capping agent selected from the group consisting of perfluoroaldehydes, perfluoroketones, perfluoroalkanoylchlorides, perfluoroesters, perfluoroetheresters, formylesters, polyoxyalkenylene esters, aminoaldehydes, metallocenealdehydes, epoxides of aldehydes, diepoxides of ketones, and epoxide derivatives of silanes wherein at least one first functionality extends from the core and a second functionality, which is different from the first functionality, on the capping agent reacts with the polymer core and attaches the capping agent molecule to the core through the second functionality.

2. A process for making a core functionalized star block copolymer which comprises:

(a) anionically polymerizing at least one set of polymer arms of a vinyl aromatic hydrocarbon and/or a conjugated diene, (b) coupling the polymer arms with a polyalkenyl aromatic coupling agent and not terminating the coupling reaction, (c) capping the core of the living star polymer by reacting it with an asymmetric bi- or polyfunctional capping agent selected from the group consisting of perfluoroaldehydes, perfluoroketones, perfluoroalkanoylchlorides, perfluoroesters, perfluoroetheresters, formylesters, polyoxyalkenylene esters, aminoaldehydes, metallocenealdehydes, epoxides of aldehydes, diepoxides of ketones, and epoxide derivatives of silanes wherein at least one first functionality extends from the core and a different second functionality, which is different from the first functionality, which reacts with the polymer core to attach the capping agent molecule to the core through the second functionality, and (d) terminating the capping reaction and recovering the polymer.

\* \* \* \* \*